UNITED STATES PATENT OFFICE.

JOHN WILLIAM IVERY, OF DILLSBURG, PENNSYLVANIA.

ARTIFICIAL FUEL.

No. 906,431.  Specification of Letters Patent.  Patented Dec. 8, 1908.

Application filed August 7, 1907. Serial No. 387,520.

*To all whom it may concern:*

Be it known that I, JOHN WILLIAM IVERY, a citizen of the United States, residing at Dillsburg, in the county of York and State of Pennsylvania, have invented certain new and useful Improvements in Artificial Fuel; and I do declare the following to be a full, clear, and exact description of the invention, such as will enable others skilled in the art to which it appertains to make and use the same.

This invention relates to artificial fuel to be made in the form of briquets, and has for its object to produce an inexpensive fuel in the manufacture of which a large percentage of waste material is utilized; one which will effectually withstand the rough handling incident to transportation, and one which will not be affected by climatic changes.

A further object of the invention is to combine with the main or body material a comparatively inexpensive binding material which will render the mass hard and solid to permit of its being readily molded into briquets which will preserve the integrity of the molded material.

A further object of the invention is to provide a novel form of waterproofing material with which the otherwise completed fuel is coated, and which will effectually exclude moisture, thus to preserve the material in perfect condition for a practically indefinite period.

With the above and other objects in view, the invention comprises the novel combination and arrangement of materials as more fully hereinafter described.

The improved artificial fuel as produced in accordance with the invention consists of a base or body material such as culm, obtained from anthracite or bituminous coal, or of peat or lignite, there being added to said base or body material a suitable percentage of black oxid of manganese, the material being united in the mass by a binder consisting of a suitable proportion of flour of wheat or other cereal, and carbonate of soda.

In carrying out the process one or another, or two of the base or body materials above named, together with the manganese and flour and soda are mixed *en masse* in a suitable mixing machine, together with a sufficient quantity of water to render the material moldable. After the mass of material has been properly mixed for thoroughly commingling the ingredients it is conveyed to a briquet machine and molded into briquets of suitable size and form, the briquets being dried and waterproofed.

The waterproofing is effected by subjecting the briquets to a bath of waterproofing material consisting of tar, black oxid of manganese, ozocerite or mineral tallow, resin and kaolin; these ingredients being mixed in suitable proportions in accord with the particular base or body material employed in the production of the fuel. The proportions which are recited hereinafter have been ascertained and proved by long series of experiments, and they must be varied somewhat to suit the material to be briqueted, for instance, when lignite is used, the proportion of flour required to bind the mass together is larger than when culm is used, and the proportion of carbonate of soda is reduced. The use of black oxid of manganese may be reduced when using culm and increased when using lignite, as the flour burns freer when combined with the manganese.

It has been found by practical tests that the best results are attained in the production of the fuel by mixing the materials in the following proportions; base or body material, such as culm, peat or lignite, 2200 parts; black oxid of manganese, 20 parts, soda, 3 parts, and flour, 40 parts; while for the waterproofing material the best results are attained by mixing the ingredients in the proportions of tar, 64 parts; black oxid of manganese, 5 parts; ozocerite or mineral tallow, 4 parts; resin, 3 parts; and kaolin, 3 parts.

In action the black oxid of manganese being an oxygen-bearing substance, promotes combustion and consequently reduces smoke and other products of combustion and enhances the value of the fuel, causing it to last longer while burning. The cohering quality of the flour is developed by heating to form a starch-paste which is materially strengthened in its action by the addition of carbonate of soda, which latter also helps to bind the culm or slack together during combustion, and prevents disintegration under forced draft, thereby adapting the fuel for use in locomotives without the creation of sparks and hot cinders, such as are usually driven off through the smoke stack.

In the waterproofing coating the tar and kaolin are used as the body material, while the ozocerite is used to cause the coating to fill up the interstices on the face of the briquet, the resin being used to cause rapid hardening of the coating upon removal of the briquets from the waterproofing bath. The black oxid of manganese employed in the waterproofing serves to reduce the smoke and other products of combustion which might otherwise be created during burning of the ingredients used in this mixture, though it is advisable to have the coating applied as thin as possible to the briquets. It is to be understood, however, that the above specified proportions of the ingredients are subject to such slight variations as may be found necessary in accordance with the changes in the body material employed, and other conditions which may arise.

I have found that under this process, I am enabled to utilize the refuse from hard or soft coal, and in the latter instance to render soft coal as desirable for use as hard coal; and, further, that the finished fuel or briquets will, in practice, effectually withstand the hard usage incident to handling and transportation, and, owing to the efficiency of the waterproofing, will not be subject to the action of moisture or climatic changes, and, consequently, will be preserved in hard, perfect condition for a practically indefinite time.

I claim—

1. An artificial fuel consisting of the following ingredients mixed in the proportions named; base or body material, 2200 parts; black oxid of manganese, 20 parts; cereal flour, 40 parts, and carbonate of soda, 3 parts.

2. An artificial fuel consisting of a base or body material, black oxid of manganese, cereal flour and soda mixed in suitable proportions and formed into briquets, and a waterproofing material applied to the briquets and consisting of tar, black oxid of manganese, ozocerite or mineral tallow, resin and kaolin.

3. A waterproofing for artificial fuel consisting of the following ingredients mixed in substantially the proportions named; tar, 64 parts; black oxid of manganese, 5 parts, ozocerite or mineral tallow, 4 parts; resin, 3 parts, and kaolin, 3 parts.

In testimony whereof I have hereunto set my hand in presence of two subscribing witnesses.

JOHN WILLIAM IVERY.

Witnesses:
F. W. GALLATIN,
M. J. BAILEY.